(12) United States Patent
Lin et al.

(10) Patent No.: US 7,373,828 B2
(45) Date of Patent: May 20, 2008

(54) LANDFORM MONITORING SYSTEM HAVING PRESSURE SENSING DEVICES

(75) Inventors: Yung-Bin Lin, Taipei (TW);
Chih-Chen Lee, Taipei (TW);
Kuo-Chun Chang, Taipei (TW);
Jihn-Sung Lai, Taipei Hsien (TW);
Ping-Hsiung Wang, Taichung Hsien (TW); Chun-Chung Chen, Changhua (TW); Lu-Sheng Lee, Taipei (TW)

(73) Assignee: National Applied Research Laboratories, Taipei (TW)

( * ) Notice: Subject to any disclaimer, the term of this patent is extended or adjusted under 35 U.S.C. 154(b) by 0 days.

(21) Appl. No.: 11/706,655

(22) Filed: Feb. 15, 2007

(65) Prior Publication Data

US 2007/0289380 A1   Dec. 20, 2007

(30) Foreign Application Priority Data

Jun. 16, 2006   (TW) .............................. 95121629 A

(51) Int. Cl.
*G01L 7/00*   (2006.01)

(52) U.S. Cl. .......................................... 73/706; 73/493
(58) Field of Classification Search ................... 73/493
See application file for complete search history.

(56) References Cited

U.S. PATENT DOCUMENTS 5,481,919 A * 1/1996 Brandt, Jr. ................... 73/723

* cited by examiner

*Primary Examiner*—Andre J. Allen
(74) *Attorney, Agent, or Firm*—Ladas & Parry LLP

(57) ABSTRACT

A landform monitoring system includes a pressure sensing device mounted on a mounting frame, and including a housing unit configured with an accommodating space and having first and second openings in fluid communication with the accommodating space. A pressure sensor is attached to the housing unit, and seals the first opening. A flexible sheet is attached to the housing unit and seals the second opening. A fluid medium is filled fully in the accommodating space. When the sheet deforms as a result of an external pressure acting thereon, a pressure corresponding to the deformation of the sheet is transmitted to the pressure sensor via the fluid medium such that the pressure sensor generates a pressure sensing signal corresponding to the external pressure.

30 Claims, 6 Drawing Sheets

LANDFORM MONITORING SYSTEM HAVING PRESSURE SENSING DEVICES

CROSS-REFERENCE TO RELATED APPLICATION

This application claims priority of Taiwanese Application No. 095121629, filed on Jun. 16, 2006.

BACKGROUND OF THE INVENTION

1. Field of the Invention

The invention relates to a landform monitoring system, more particularly to a landform monitoring system including micro-electromechanical pressure sensing devices.

2. Description of the Related Art

In order to monitor a river landform, a conventional monitoring apparatus is used and includes a weight hammer hung by a steel cord and sunk into a river to measure the elevation of the riverbed so as to monitor the riverbed conditions. However, in the conventional monitoring apparatus, since the weight hammer is hung by a steel cord, an assembly of the weight hammer and the steel cord may swing as a result of flow of river water and wind, thereby hampering the measurement accuracy.

In order to monitor a slope landform, another conventional monitoring apparatus is used and includes a sensing cable extending vertically and disposed adjacent to a slope, and a detector for detecting vibration of the sensing cable as a result of falling stones from the slope. As such, the slip conditions of the slope landform can be evaluated based on the vibration of the sensing cable. However, the variation monitored by the conventional monitoring apparatus cannot provide accurate evaluation for variation of the slope landform.

SUMMARY OF THE INVENTION

Therefore, the object of the present invention is to provide a landform monitoring system having pressure sensing devices that can overcome the aforesaid drawbacks of the prior art.

According to one aspect of the present invention, a landform monitoring system comprises:
  a mounting frame adapted to be fixed at a position adjacent to a landform to be monitored and having an outer surface; and
  a plurality of sensing units mounted on the mounting frame, each of the sensing units including a pressure sensing device that includes
    a housing unit configured with an accommodating space and having a first opening in fluid communication with the accommodating space and distal from the outer surface of the mounting frame, and a second opening in fluid communication with the accommodating space and adjacent to the outer surface of the mounting frame,
  A pressure sensor having a pressure sensing side attached to the housing unit and sealing the first opening,
  a flexible sheet attached to the housing unit and sealing the second opening, and
  a fluid medium filled fully in the accommodating space in the housing unit,
  wherein, when the sheet deforms as a result of an external pressure acting thereon, a pressure corresponding to the deformation of the sheet is transmitted to the pressure sensing side of the pressure sensor via the fluid medium such that the pressure sensor generates a pressure sensing signal corresponding to the external pressure.

According to another aspect of the present invention, a pressure sensing device comprises:
  a housing unit configured with an accommodating space and having first and second openings in fluid communication with the accommodating space;
  a pressure sensor having a pressure sensing side attached to the housing unit and sealing the first opening;
  a flexible sheet attached to the housing unit and sealing the second opening; and
  a fluid medium filled fully in the accommodating space in the housing unit.

When the sheet deforms as a result of an external pressure acting thereon, a pressure corresponding to the deformation of the sheet is transmitted to the pressure sensing side of the pressure sensor via the fluid medium such that the pressure sensor generates a pressure sensing signal corresponding to the external pressure.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
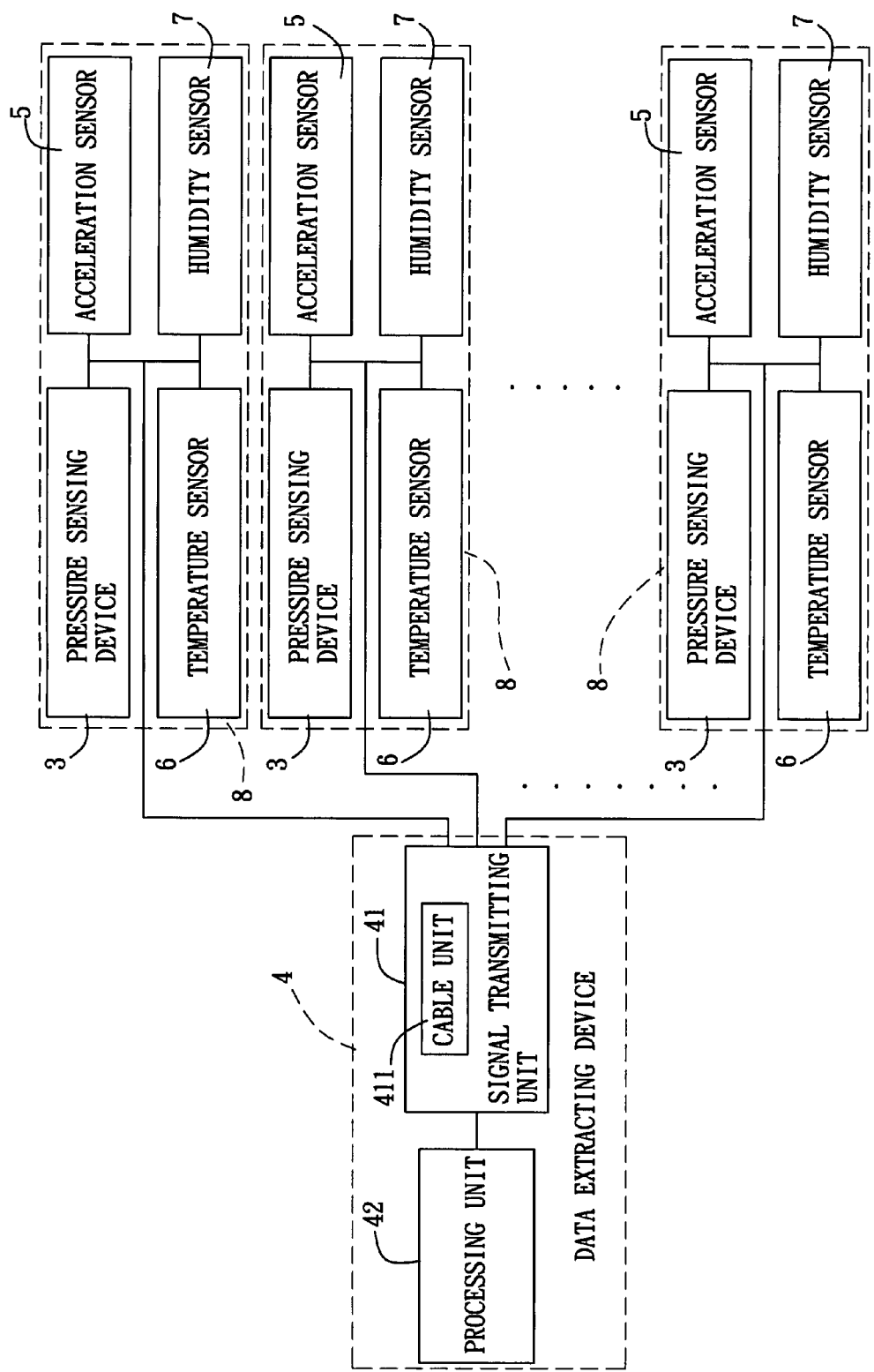
FIG. 1 is a schematic circuit block diagram illustrating the first preferred embodiment of a landform monitoring system according to the present invention.

Before the present invention is described in greater detail, it should be noted that like elements are denoted by the same reference numerals throughout the disclosure.

Figure 2:
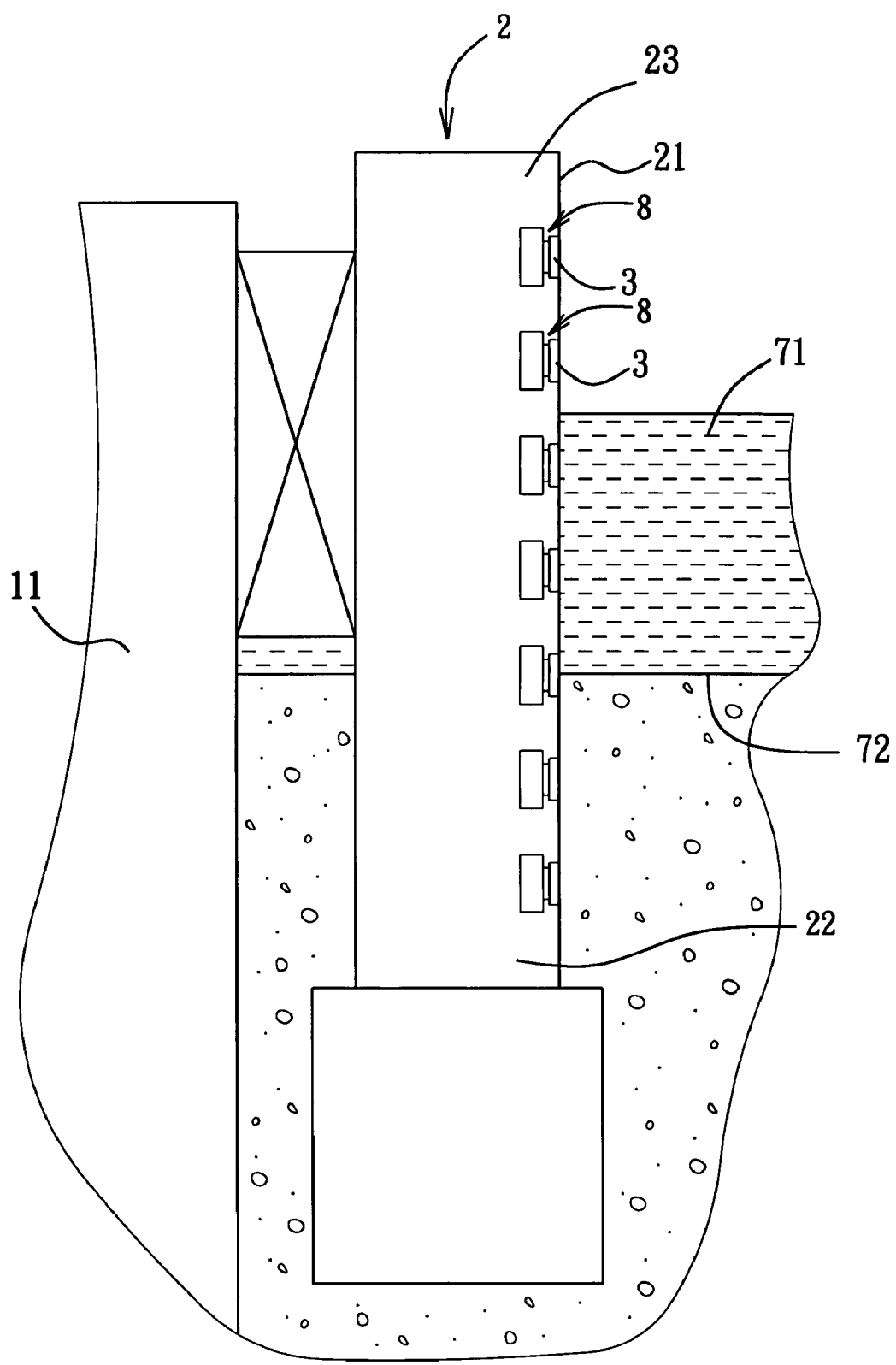
FIG. 2 is a schematic view showing a mounting frame and sensing units of the first preferred embodiment.

Referring to FIGS. 1 and 2, the first preferred embodiment of a landform monitoring system according to the present invention is shown to be adapted for monitoring a river landform, such as a river level and a riverbed elevation. The landform monitoring system includes a mounting frame 2, a plurality of sensing units 8, and a data extracting device 4.

The mounting frame 2 is adapted to be fixed at a position adjacent to a landform to be monitored, such as a river. In this embodiment, the mounting frame 2 is adapted to be connected fixedly to a bridge pier 11 that is disposed in the river. The mounting frame 2 has a lower end portion 22 embedded in the riverbed 72, an upper end portion 23 opposite to the lower end portion 33 and extending upwardly and outwardly of the river water 71, and an outer surface 21.

The sensing units 8 are mounted on the mounting frame 2, and are arranged vertically as shown in FIG. 2. In this embodiment, each sensing unit 8 includes a pressure sensing device 3, an acceleration sensor 5, a temperature sensor 6 and a humidity sensor 7.

Figure 3:
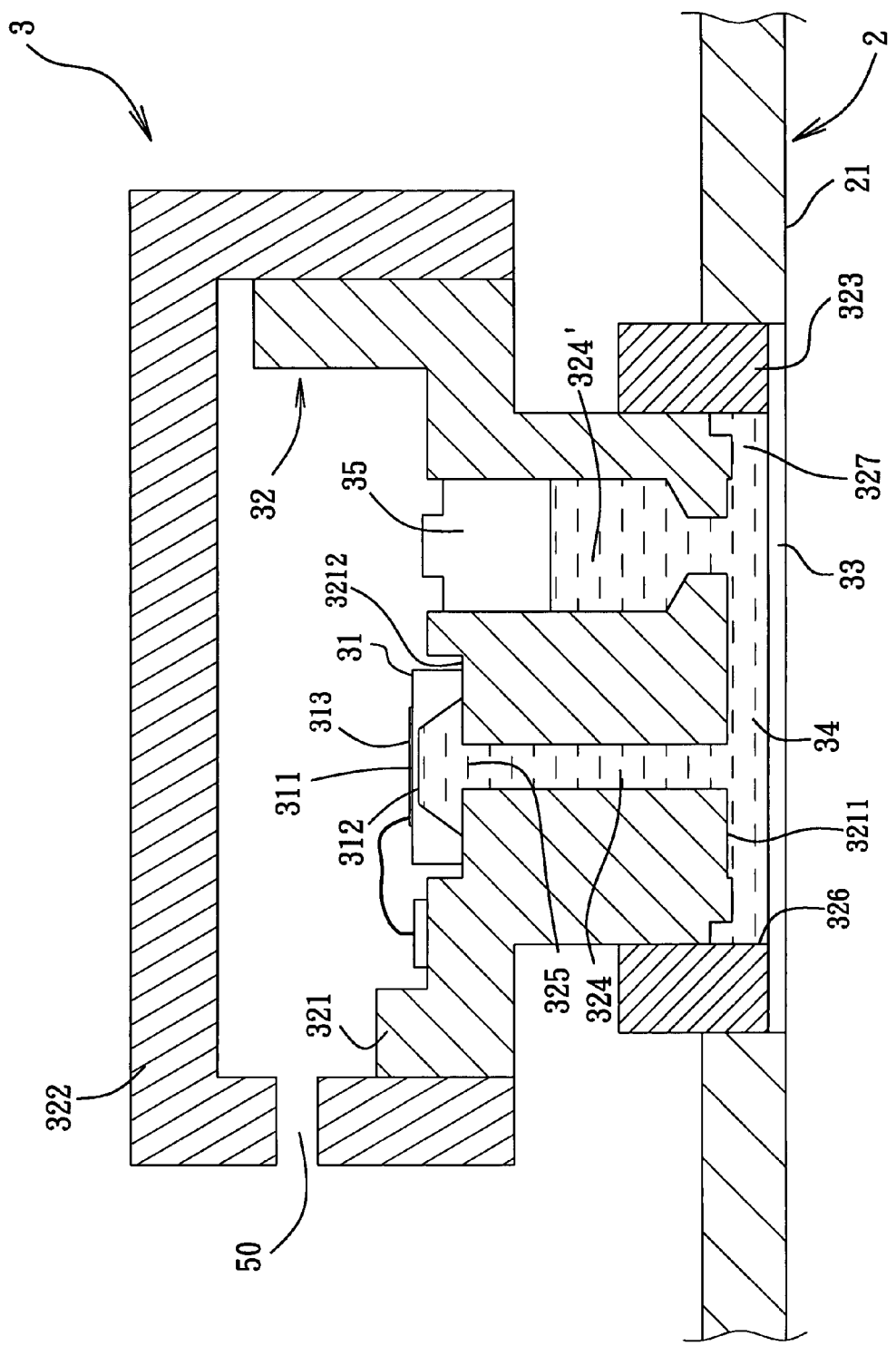
FIG. 3 is a schematic sectional view showing the pressure sensing device of the first preferred embodiment.

Referring further to FIG. 3, the pressure sensing device 3 of each sensing unit 8 includes a housing unit 32, a pressure sensor 31, a flexible sheet 33, and a fluid medium 34. The housing unit 32 is configured with an accommodating space 327, and has a first opening 325 in fluid communication with the accommodating space 327, and a second opening 326 in fluid communication with the accommodating space 327 and adjacent to the outer surface 21 of the mounting frame 2. The first opening 325 is smaller than the second opening 326. In this embodiment, the housing unit 32 includes a substrate 321, a sleeve body 323 and a cover body 322. The substrate 321 is configured with the first opening 325, and has a first surface 3211 adjacent to the outer surface 21 of the mounting frame 2, and a second surface 3212 opposite to the first surface 3211, a first channel 324 extending from the first surface 3211 to the second surface 3212 and configured with the first opening 325, and a second channel 324' extending from the first surface 3211 to the second surface 3212, in fluid communication with the accommodating space 327 and having an end that is adjacent to the second surface 3212. The sleeve body 323 is mounted on the mounting frame 2, is sleeved sealingly on the substrate 321, and is configured with the second opening 326. The sleeve body 323 cooperates with the substrate 321 so as to define the accommodating space 327. The cover body 322 is covered over the second surface 3212 of the substrate 321. The pressure sensor 31 has a pressure sensing side 312 attached to the housing unit 32 and seals the first opening 325. In this embodiment, the pressure sensor 31 is configured as a silicone pressure sensor, and further has a circuit-mounting side 311 opposite to the pressure sensing side 312 and provided with an electronic circuit 313 thereon. The sheet 33 is attached to the sleeve body 323 of the housing unit 32 and seals the second opening 326. In this embodiment, the sheet 33 is made of a metal material, such as stainless steel. The fluid medium 34 is filled fully in the accommodating space 327 via the second channel 324' in the substrate 321. Thereafter, the end of the second channel 324' is sealed by a plug 35. In this embodiment, the fluid medium 34 is oil, which is non-compressible. As such, when the sheet 33 deforms as a result of an external pressure acting thereon that results from one of soil compositions of the river landform, such as riverbed, river water and air, a pressure corresponding to the deformation of the sheet 33 is transmitted to the pressure sensing side 312 of the pressure sensor 31 via the fluid medium 34 such that the pressure sensor 31 generates a pressure sensing signal corresponding to the external pressure.

The acceleration sensor 5 of each sensing unit 8 is mounted fixedly on the mounting frame 2 for sensing vibration of the mounting frame 2 that results from variation of the river landform in a known manner so as to generate an acceleration sensing signal corresponding to the vibration of the mounting frame 2.

The temperature sensor 6 of each sensing unit 8 is mounted on the mounting frame 2, and is adapted for sensing a temperature around a location of the temperature sensor 6 in a known manner so as to generate a temperature sensing signal corresponding to the temperature.

The humidity sensor 7 of each sensing unit 8 is mounted on the mounting frame 2, and is adapted for sensing a humidity around a location of the humidity sensor 7 in a known manner so as to generate a humidity sensing signal corresponding to the humidity.

In this embodiment, an assembly of the acceleration sensor 5, the temperature sensor 6 and the humidity sensor 7 of each sensing unit 8 can be configured as a single circuit module.

As shown in FIG. 1, the data extracting device 4 includes a signal transmitting unit 41 and a processing unit 42. In this embodiment, the signal transmitting unit 41 includes a cable unit 411 interconnecting electrically the pressure sensing devices 3, the acceleration sensor 5, the temperature sensor 6 and the humidity sensor 7 of each sensing unit 8, and the processing unit 42. The processing unit 42 receives the pressure sensing signal, the acceleration sensing signal, the temperature sensing signal and the humidity sensing signal from each sensing unit 8 via the signal transmitting unit 41 so as to obtain pressure information corresponding to the external pressure, acceleration information corresponding to the vibration of the mounting frame 2, temperature information and humidity information, thereby monitoring the landform based on the pressure information, the acceleration information, the temperature information and the humidity information.

Figure 4:
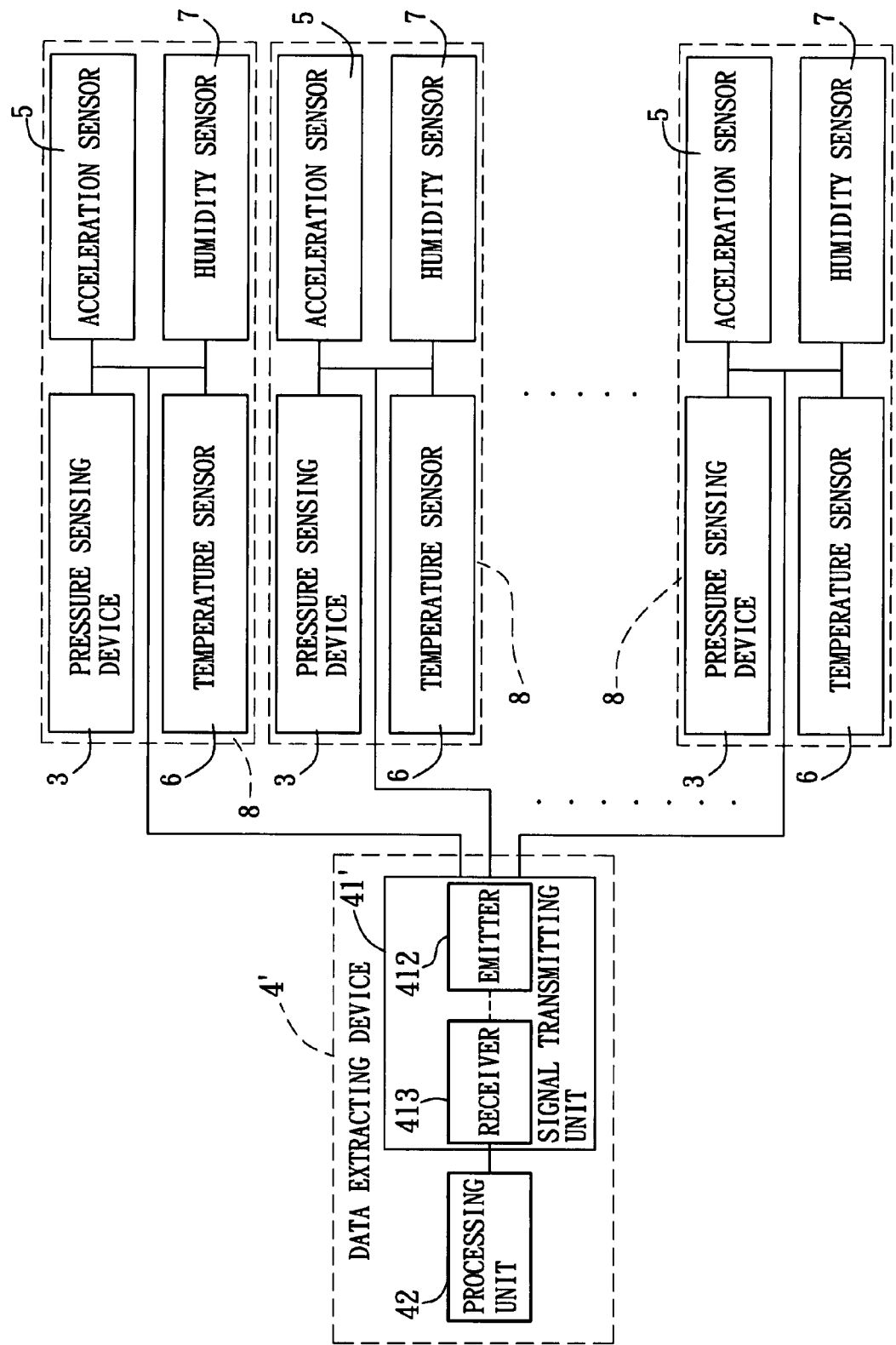
FIG. 4 is a schematic circuit block diagram illustrating the second preferred embodiment of a landform monitoring system according to the present invention.
Figure 5:
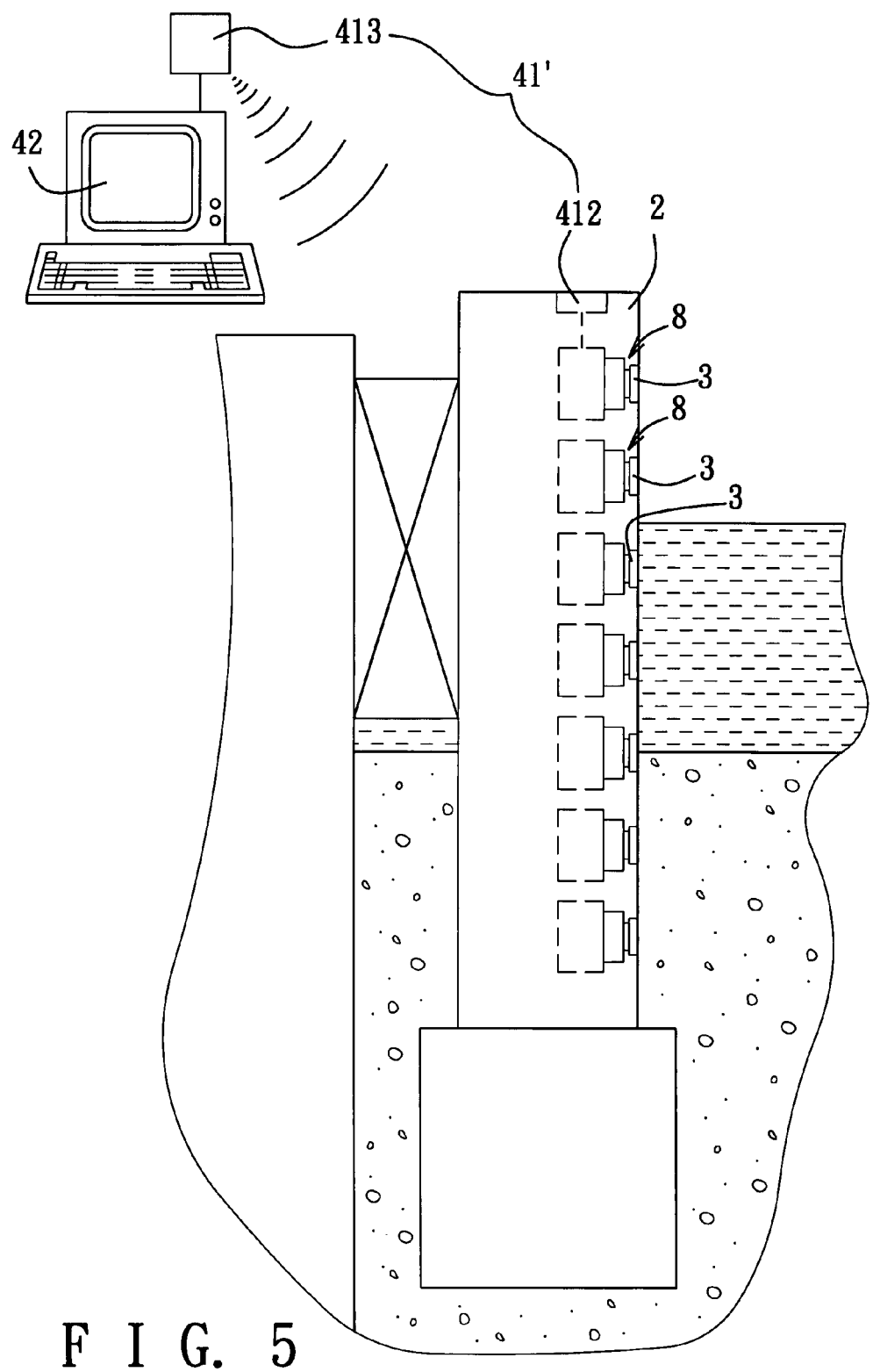
FIG. 5 is a schematic view showing the second preferred embodiment, illustrating how a mounting frame and sensing units are mounted to a river landform.

FIGS. 4 and 5 illustrate the second preferred embodiment of a landform monitoring system according to this invention, which is a modification of the first preferred embodiment. Unlike the previous embodiment, the signal transmitting unit 41' of the data extracting device 4' includes an emitter 412 and a receiver 413. The emitter 412 is mounted on the mounting frame 2, and is connected electrically to the sensing units 8. The receiver 413 is connected electrically to the processing unit 42 and communicates with the emitter 412 via a wireless communications network. In this embodiment, for each sensing unit 8, the emitter 412 receives and emits the pressure sensing signal from the pressure sensor 31, the acceleration sensing signal from the acceleration sensor 5, the temperature sensing signal from the temperature sensor 6 and the humidity sensing signal from the humidity sensor 7. The receiver 413 receives the pressure sensing signal, the acceleration sensing signal, the temperature sensing signal and the humidity sensing signal emitted by the emitter 412 via the wireless communications network.

Figure 6:
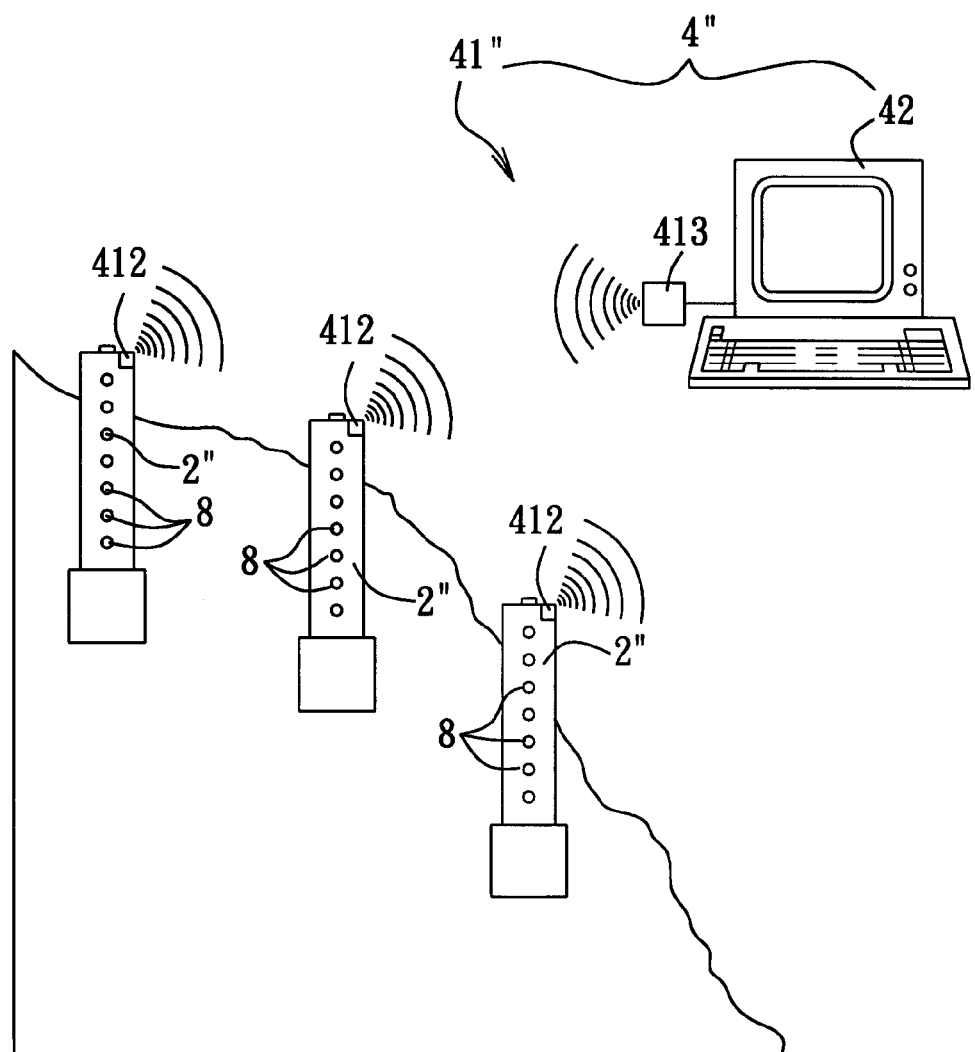
FIG. 6 is a schematic view showing the third preferred embodiment of a landform monitoring system according to the present invention.
Figure 7:
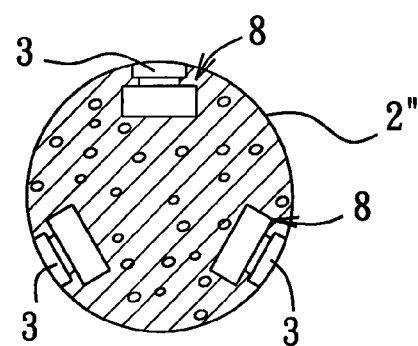
FIG. 7 is a schematic sectional view illustrating the relationship between a mounting frame and sensing units of the third preferred embodiment.

Referring to FIG. 6, the third preferred embodiment of a landform monitoring system according to the present invention is shown to be adapted for monitoring a slope landform, and is a modification of the first preferred embodiment. Unlike the second preferred embodiment, the landform monitoring system includes a plurality of mounting frames 2", each of which is mounted with a plurality of the sensing units 8. In this embodiment, the mounting frames 2" are adapted to be embedded into a slope, and are arranged along a curve of the slope. Each mounting frame 2" is configured as a post. For each mounting frame 2", the sensing units 8 are grouped into a plurality of groups, which are arranged in a longitudinal direction of the post and each having three angularly equidistant ones of the sensing units 8, as shown in FIG. 7. Furthermore, the signal transmitting unit 41" of the data extracting device 4" includes a plurality of the emitters 412 mounted respectively on the mounting frames 2", and the receiver 413.

In such a configuration, the sensing units 8 can be easily installed on each mounting frame 2, 2". Since the pressure sensor 31 of the pressure sensing device 3 of each sensing unit 8 does not directly contact the compositions of the landform to be monitored, accurate and reliable monitoring result can be ensured.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A landform monitoring system comprising:
   a mounting frame adapted to be fixed at a position adjacent to a landform to be monitored and having an outer surface; and
   a plurality of sensing units mounted on said mounting frame, each of said sensing units including a pressure sensing device that includes
   a housing unit configured with an accommodating space and having a first opening in fluid communication with said accommodating space and distal from said outer surface of said mounting frame, and a second opening in fluid communication with said accommodating space and adjacent to said outer surface of said mounting frame,
   a pressure sensor having a pressure sensing side attached to said housing unit and sealing said first opening,
   a flexible sheet attached to said housing unit and sealing said second opening, and
   a fluid medium filled fully in said accommodating space in said housing unit,
   wherein, when said sheet deforms as a result of an external pressure acting thereon, a pressure corresponding to the deformation of said sheet is transmitted to said pressure sensing side of said pressure sensor via said fluid medium such that said pressure sensor generates a pressure sensing signal corresponding to the external pressure.

2. The landform monitoring system as claimed in claim 1, further comprising a data extracting device that includes:
   a signal transmitting unit coupled to said pressure sensor of said pressure sensing device of each of said sensing units; and
   a processing unit coupled to said signal transmitting unit for receiving the pressure sensing signal generated by said pressure sensor of said pressure sensing device of each of said sensing units via said signal transmitting unit and for processing the pressure sensing signal so as to obtain pressure information corresponding to the external pressure, thereby monitoring the landform based on the pressure information.

3. The landform monitoring system as claimed in claim 2, wherein said signal transmitting unit includes a cable unit interconnecting electrically said processing unit and said sensing units.

4. The landform monitoring system as claimed in claim 2, wherein said signal transmitting unit of said data extracting device includes:
   an emitter mounted on said mounting frame and connected electrically to said sensing units; and
   a receiver connected electrically to said processing unit and communicating with said emitter via a wireless communications network.

5. The landform monitoring system as claimed in claim 1, wherein said mounting frame is configured as a post, and said sensing units are arranged in a longitudinal direction of said post.

6. The landform monitoring system as claimed in claim 1, wherein said sensing units are grouped into a plurality of groups each having three angularly equidistant ones of said sensing units.

7. The landform monitoring system as claimed in claim 1, wherein said pressure sensor of said pressure sensing device of each of said sensing units is configured as a silicone pressure sensor.

8. The landform monitoring system as claimed in claim 1, wherein said pressure sensor of said pressure sensing device of each of said sensing units has a circuit-mounting side opposite to said pressure sensing side and provided with an electronic circuit thereon.

9. The landform monitoring system as claimed in claim 1, wherein said housing unit of said pressure sensing device of each of said sensing units includes:
   a substrate configured with said first opening; and
   a sleeve body mounted on said mounting frame, sleeved sealingly on said substrate and configured with said second opening, said sleeve body cooperating with said substrate so as to define said accommodating space.

10. The landform monitoring system as claimed in claim 9, wherein said housing unit of said pressure sensing device of each of said sensing units further includes at least one plug, and said substrate of said housing unit of said pressure sensing device of each of said sensing units has a first surface adjacent to said outer surface of said mounting frame, a second surface opposite to said first surface and mounted with said pressure sensor, a first channel extending from said first surface to said second surface and configured with said first opening, and at least one second channel extending from said first surface to said second surface, in fluid communication with said accommodating space and having an end that is adjacent to said second surface and sealed by said plug.

11. The landform monitoring system as claimed in claim 10, wherein said housing unit of said pressure sensing device of each of said sensing units further includes a cover body covered over said second surface of said substrate.

12. The landform monitoring system as claimed in claim 1, wherein said sheet is made of a metal material.

13. The landform monitoring system as claimed in claim 12, wherein said sheet is made of stainless steel.

14. The landform monitoring system as claimed in claim 1, wherein said fluid medium is non-compressible.

15. The landform monitoring system as claimed in Claim 14, wherein said fluid medium includes oil.

16. The landform monitoring system as claimed in claim 1, wherein said first opening in said housing unit of said pressure sensing device of each of said sensing units is smaller than said second opening in said housing unit of said pressure sensing device of a corresponding one of said sensing units.

17. The landform monitoring system as claimed in claim 2, wherein:
   each of said sensing units further includes an acceleration sensor mounted fixedly on said mounting frame, coupled to said signal transmitting unit of said data extracting device and sensing vibration of said mounting frame so as to generate an acceleration sensing signal corresponding to the vibration of said mounting frame; and
   said processing unit of said data extracting device further receives the acceleration sensing signal generated by said acceleration sensor via said signal transmitting unit and processing the acceleration sensing signal so as to obtain acceleration information corresponding to the vibration of said mounting frame, thereby monitoring the landform based on the acceleration information.

18. The landform monitoring system as claimed in claim 2, wherein:
each of said sensing units further includes a temperature sensor mounted on said mounting frame, coupled to said signal transmitting unit of said data extracting device and adapted for sensing temperature around a location of said temperature sensor so as to generate a temperature sensing signal corresponding to the temperature; and
said processing unit of said data extracting device further receives the temperature sensing signal generated by said temperature sensor via said signal transmitting unit, and processes the temperature sensing signal so as to obtain temperature information corresponding to the temperature, thereby monitoring the landform based on the temperature information.

19. The landform monitoring system as claimed in claim 2, wherein:
each of said sensing units further includes a humidity sensor mounted on said mounting frame, coupled to said signal transmitting unit of said data extracting device and adapted for sensing humidity around a location of said humidity sensor so as to generate a humidity sensing signal corresponding to the humidity; and
said processing unit of said data extracting device further receives the humidity sensing signal generated by said humidity sensor via said signal transmitting unit, and processes the humidity sensing signal so as to obtain humidity information corresponding to the humidity, thereby monitoring the landform based on the humidity information.

20. A pressure sensing device comprising:
a housing unit configured with an accommodating space and having first and second openings in fluid communication with said accommodating space;
a pressure sensor having a pressure sensing side attached to said housing unit and sealing said first opening;
a flexible sheet attached to said housing unit and sealing said second opening; and
a fluid medium filled fully in said accommodating space in said housing unit;
wherein, when said sheet deforms as a result of an external pressure acting thereon, a pressure corresponding to the deformation of said sheet is transmitted to said pressure sensing side of said pressure sensor via said fluid medium such that said pressure sensor generates a pressure sensing signal corresponding to the external pressure.

21. The pressure sensing device as claimed in claim 20, wherein said pressure sensor is configured as a silicone pressure sensor.

22. The pressure sensing device as claimed in claim 20, wherein said pressure sensor has a circuit-mounting side opposite to said pressure sensing side and provided with an electronic circuit thereon.

23. The pressure sensing device as claimed in claim 20, wherein said housing unit includes:
a substrate configured with said first opening; and
a sleeve body sleeved sealingly on said substrate and configured with said second opening, said sleeve body cooperating with said substrate so as to define said accommodating space.

24. The pressure sensing device as claimed in claim 23, wherein said housing unit further includes at least one plug, and said substrate of said housing unit has a first surface adjacent to said second opening, a second surface opposite to said first surface and mounted with said pressure sensor, a first channel extending from said first surface to said second surface and configured with said first opening, and at least one second channel extending from said first surface to said second surface and having an end that is adjacent to said second surface and sealed by said plug.

25. The pressure sensing device as claimed in claim 24, wherein said housing unit further includes a cover body covered over said second surface of said substrate.

26. The pressure sensing device as claimed in claim 20, wherein said sheet is made of a metal material.

27. The pressure sensing device as claimed in claim 26, wherein said sheet is made of stainless steel.

28. The pressure sensing device as claimed in claim 20, wherein said fluid medium is non-compressible.

29. The pressure sensing device as claimed in claim 28, wherein said fluid medium includes oil.

30. The pressure sensing device as claimed in claim 20, wherein said first opening in said housing unit is smaller than said second opening in said housing unit.

* * * * *